United States Patent
Marcellin

(10) Patent No.: US 8,102,767 B2
(45) Date of Patent: Jan. 24, 2012

(54) SYSTEMS AND METHODS FOR DYNAMICALLY ALLOCATING NETWORK BANDWIDTH

(75) Inventor: Michael E. Marcellin, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 11/647,152

(22) Filed: Dec. 29, 2006

(65) Prior Publication Data

US 2008/0219170 A1    Sep. 11, 2008

(51) Int. Cl.
*G01R 31/08* (2006.01)

(52) U.S. Cl. .......................................... 370/232

(58) Field of Classification Search ........... 370/229–240
See application file for complete search history.

(56) References Cited

U.S. PATENT DOCUMENTS

| | | | | |
|---|---|---|---|---|
| 7,756,026 | B2 * | 7/2010 | Weiss et al. | 370/230 |
| 2003/0002529 | A1 * | 1/2003 | Gibbons et al. | 370/468 |
| 2003/0120705 | A1 * | 6/2003 | Chen et al. | 709/104 |
| 2004/0105389 | A1 * | 6/2004 | Huang et al. | 370/238 |
| 2005/0038658 | A1 * | 2/2005 | Sladden | 704/270.1 |
| 2006/0109960 | A1 * | 5/2006 | D'Evelyn et al. | 379/37 |

* cited by examiner

*Primary Examiner* — Kwang B Yao
*Assistant Examiner* — Tung Q Tran

(57) ABSTRACT

An improved system for allocating bandwidth allows a network customer to dynamically modify bandwidth settings for their private networks. Applicable modified bandwidth settings may include port speed, committed access rate, and Ethernet flow. Port speed determines how much total data may pass through a node in a private network at one time, while committed access rate determines how much bandwidth the node will commit to a particular class of service. Ethernet flow governs the bandwidth allowed over a private line between two nodes. A bandwidth modification request is received by an input interface, which provides it to a processing server that schedules the modification request for committal. The processing server also changes customer billing information accordingly. Additionally, the user may specify a future time when the bandwidth modification request should be committed.

17 Claims, 15 Drawing Sheets

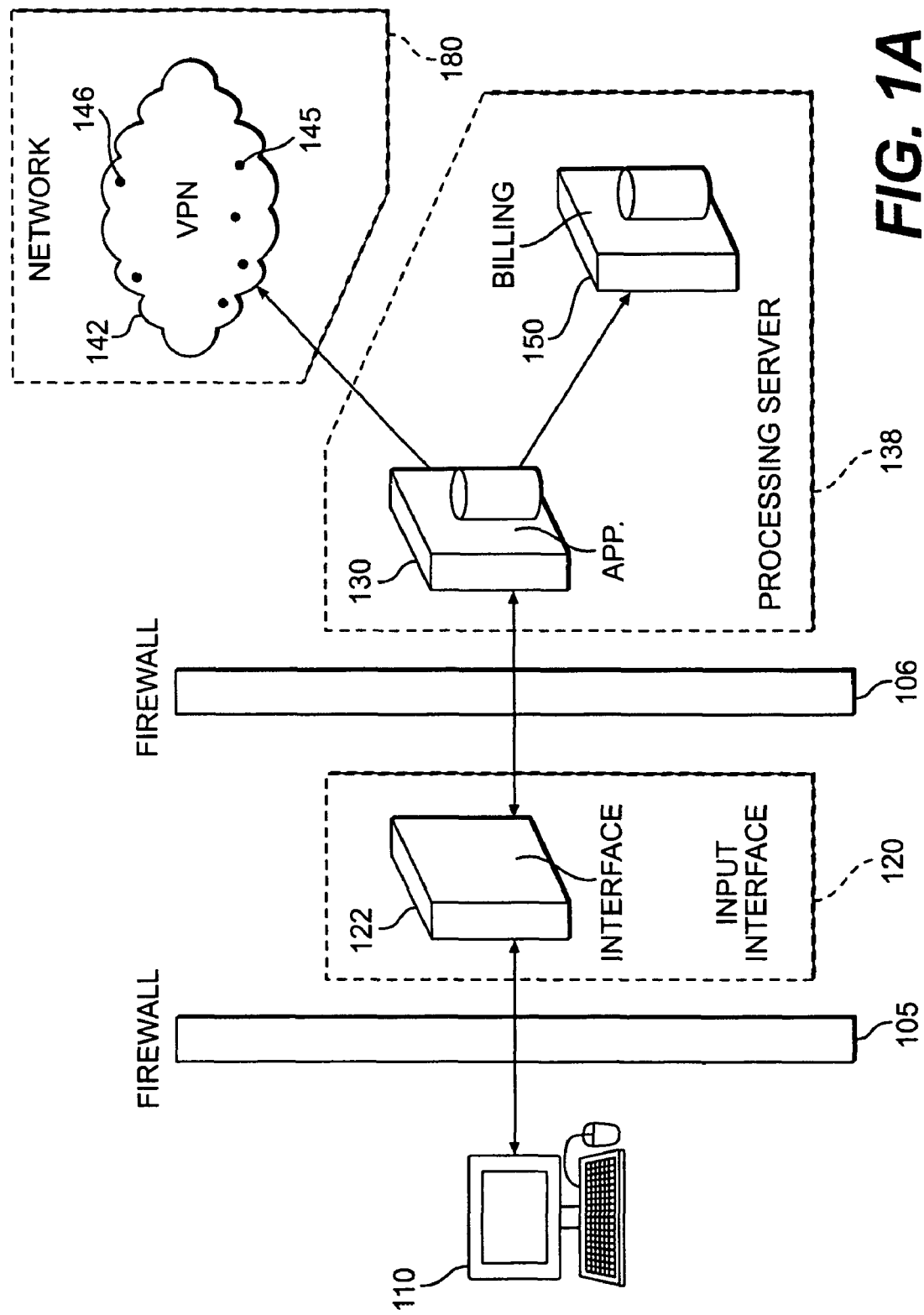

MAIN MENU
▷ VPN SITES
▷ HISTORY
▷ ADMIN FUNCTIONS
▷ HELP
▷ CONTACT US

◎ HOME

MODIFY CLASS OF SERVICE & CAR VALUES

[CANCEL] [CREATE CAR VALUE CHANGE ORDER]~620

LOCATION: CHICAGO IL
DESCRIPTION: DOWNERS GROVE
CIRCUIT ID: WOK75711
PVC ID: 9910001
PORT SPEED: 256 (kbps)

SERVICE: [STANDARD ▽]~530

COMMITTED ACCESS RATE: [128 ▽]~610

CONFIRMATION

1110 — YOU ACKNOWLEDGE THAT BY SUBMITTING THIS ORDER, THE MONTHLY CHARGES BILLED TO THIS ACCOUNT WILL INCREASE OR DECREASE IN ACCORDANCE WITH THE CHANGES YOU HAVE MADE TO YOUR NETWORK'S BANDWIDTH. CLICK "ACCEPT" BELOW TO ACKNOWLEDGE YOUR ACCEPTANCE OF THESE CHARGES TO YOUR ACCOUNT AND YOUR AGREEMENT TO PAY AT THE CORRESPONDINGLY DIFFERENT RATES.

1120 — IF THIS IS A CAR OR PORT CHANGE REQUEST, PLEASE MAKE SURE TO UNDERSTAND THE CONFIGURATION CHANGES THAT NEED TO OCCUR BASED ON THE CAR OR PORT CHANGE THAT ARE BEING MADE.

PLEASE PRINT A COPY OF THIS REQUEST FOR YOUR RECORDS

TO ACCEPT THIS TERM PLEASE CLICK [ACCEPT] TO CONTINUE.
1130

[PRINT] [CANCEL]
1140

LOCAL INTRANET

DYNAMIC BANDWIDTH

⌂ HOME

SITE DETAIL (WEBSTER, NY) 1210  1220  1230

[MODIFY PORT SPEED] [MODIFY CAR VALUE] [SCHEDULE BANDWIDTH CHANGE]

455 — LOCATION: WEBSTER, NY          IP ADDRESS: 8.7.8.9
      DESCRIPTION: WEBSTER OFFICE    ENCAPSULATION: FR
      CIRCUIT ID: 123ABC             ROUTING PROTOCOL: BGP
      PVC ID: 06998                  PORT SPEED: 256 (kbps)
465 — SERVICE: STANDARD              PRIVATE CONNECTION: 128

RELATED ORDERS (CLICK ON THE HEADER COLUMN TO SORT)

| ORDER # | TYPE | STATUS | REQUESTED DATE | DATE OF LAST ACTIVITY |
|---|---|---|---|---|
| 10083 | PORT | SCHEDULED | 2006/12/25 01:00:00 | 2005/12/09 18:47:53 |
| 10082 | PORT | SCHEDULED | 2006/12/17 01:00:00 | 2005/12/09 18:47:53 |
| 10081 | CAR  | SCHEDULED | 2006/12/17 01:00:00 | 2005/12/09 18:47:53 |
| 10080 | PORT | SCHEDULE FAILED | 2006/12/01 00:00:00 | 2005/12/01 02:58:50 |
| 10079 | CAR  | SCHEDULE FAILED | 2006/12/01 00:00:00 | 2005/12/01 02:58:50 |
| 10078 | PORT | SCHEDULE CANCELLED | 2006/12/01 00:00:00 | 2005/11/30 17:43:31 |
| 10077 | CAR  | SCHEDULE CANCELLED | 2006/12/01 00:00:00 | 2005/11/30 17:43:31 |
| 105   | CAR  | PROCESS COMPLETED |  | 2005/11/26 16:42:29 |
| 61    | CAR  | PROCESS REJECTED | 2005/12/21 01:00:00 | 2005/11/26 16:42:29 |
| 43    | CAR  | AWAITING SUBMIT |  | 2005/11/26 16:42:29 |
| 42    | PORT | AWAITING SUBMIT |  | 2005/11/26 16:42:29 |
| 41    | PORT | PROCESS INVALID |  | 2005/11/26 16:42:29 |

MAIN MENU
▸ VPN SITES
▸ SCHEDULED PACKAGE
▸ ADMIN FUNCTIONS
▸ HELP
▸ CONTACT US 1250  1260  1240

PRIVACY POLICY | LEGAL NOTICES | SERVICE TERMS & RATES | SITE MAP

*FIG. 12*

RESCHEDULING SCHEDULED GROUP

CANCEL ▼ RESCHEDULE THIS GROUP ▼

SCHEDULE STATUS: JOBS NEED ATTENTION ~950

SCHEDULED GROUP ID: 10140
DATE OF LAST ACTIVITY: 2006/09/07 00:00:01
REQUESTED DATE: 2006/09/07 00:00:00

RESCHEDULE GROUP TO: 01 ▼ OCT 2006 ▼ 12AM ▼ GMT ~1310

| ORDER # | JOB STATUS | JOB TYPE | SPEED/SERVICE | DATE OF LAST ACTIVITY |
|---|---|---|---|---|
| 201 | ORDER SCHEDULED | EVC | 30(Mbs) | 2006/08/31 18:42:02 |

CLICK ON THE HEADER COLUMN TO SORT

MAIN MENU ▼
SITE LOCATIONS ▼
SEARCH ▼
ADMIN FUNCTIONS ▼
HELP ▼
CONTACT US ▼

FIG. 13

SYSTEMS AND METHODS FOR DYNAMICALLY ALLOCATING NETWORK BANDWIDTH

BACKGROUND OF THE INVENTION

Generally speaking, a network is made up of a series of elements or nodes and can be in a variety of configurations, such as private networks or virtual private networks. For the purposes of this disclosure, a node is a point on the network that usually includes a switching circuit, router, controller, hub, or computer that transmits, receives, and/or directs data traffic.

Private networks are often used by one or more companies to securely share information with employees, suppliers, vendors, customers, or other businesses. In contrast to a local area network, a virtual private network (VPN) is one type of private network commonly used to extend geographic connectivity, reduce operational costs, and allow employees to access information remotely, among other uses. A VPN may be generally thought of as a series of nodes that are securely connected in a configuration that allows the nodes to privately communicate with each other. Some VPNs utilize dedicated private lines, and can be thought of as an extension of local area networks. Other VPNs use tunneling technology to transmit data securely through a public network (e.g., the Internet).

A wide area network (WAN) is yet another configuration for networks. Private Internet Protocol (PIP) is one way nodes communicate over a WAN. WANs connect different local area networks together so that computers in one location (via a first node) can communicate with computers in another location (via a second node). Private IP networks usually implement the Multi-Protocol Label Switching (MPLS) standard, which involves assigning short, fixed-length labels to each IP packet. Other standards may also be used, so long as the resulting network is private and secure.

VPNs are particularly valuable in the implementation of intranets or extranets. In general, an intranet can be thought of as a type of private network for sharing information. For example, the intranet may include a website only available within the private network. A company may need to set up an intranet in such a way that it is accessible from several locations rather than just one local office or computer. The private network, such as a VPN, may allow employees in one office to securely access an intranet server in another office. An extranet, on the other hand, is a part of the intranet that is extended to users outside of the organization. For example, customers of the business may have access to a portal allowing access to the business extranet for securely placing orders. Similarly, employees may remotely connect to some private networks by securely tunneling through the Internet (a type of public network) to access the private network.

Multiple geographic sites in a private network (e.g., WAN) are usually connected by nodes controlled by a service provider. The speed with which different sites can communicate with one another generally depends on the bandwidth available on the network. Considerations that affect overall bandwidth may include port speed and/or committed access rate. Port speed is usually the top speed at which data can be transferred through a node at any given time. For example, a 28.8 modem can move 28.8 kilobits over one second. Committed access rate (CAR) is a feature used to rate limit traffic across a node, sometimes based on the class of service that the traffic belongs to. This is useful because some time-critical services, such as Voice Over IP (VoIP), may require more bandwidth than other services. Less bandwidth may suffice for less time-critical services, such as general web browsing. Through classification, low priority traffic can be assigned to a lower committed access rate, theoretically preventing low priority traffic from stealing too much available bandwidth. In addition, the committed access rate may vary across different nodes to accommodate differing levels of traffic on those nodes. Bandwidth allocation may even be based on groups of users in some network configurations.

Similar to committed access rate, Ethernet flow is an important bandwidth consideration for limiting bandwidth over a private line. A private line may be a dedicated path through a network from a starting node, sometimes including a first switch installed onsite for a customer, to an ending node. The dedicated path is usually formed by a series of switches. Private lines generally, but not always, extend from one customer site to another. Some network types, such as an Ethernet, rely heavily on private lines. Unlike PIP, which is a layer 3 technology, Ethernet is a layer 2 technology and does not require routing.

The available bandwidth across a private network generally depends on the hardware used and the terms of agreement with the service provider that controls the nodal connections. If too little bandwidth is purchased, the private network may not handle the traffic required by the business and operational efficiency will suffer. On the other hand, purchasing too much bandwidth can be a costly and unnecessary expense.

Unfortunately, the amount of bandwidth needed on a private network constantly changes. As a company grows or as the use of the private network evolves, bandwidth may need to be distributed differently. Resolving these issues with the service provider can be arduous because no streamlined system or method for making bandwidth changes currently exists. Modifying the port speed and/or committed access rate for a node on the network currently takes around ten (10) business days, assuming everything is handled correctly. As a result, customers often needlessly pay for too much bandwidth or fail to address bandwidth shortcomings until network deficiencies begin to eat away at company profits and/or workflow effectiveness.

BRIEF DESCRIPTION OF THE DRAWINGS

The accompanying drawings, which are incorporated in and constitute part of this specification, and together with the description, illustrate and serve to explain the principles of various exemplary embodiments.

FIGS. 1A-1B are overview diagrams of exemplary components used to dynamically allocate network bandwidth in accordance with certain exemplary embodiments.

FIGS. 5-8 are exemplary diagrams of exemplary user interface screens for creating a bandwidth modification request in accordance with an exemplary embodiment.

FIG. 11 is an exemplary diagram of a confirmation in accordance with an exemplary embodiment.

FIG. 12 is an exemplary diagram of a user interface screen for selecting and modifying an uncommitted bandwidth modification request in accordance with an exemplary embodiment.

FIG. 13 is an exemplary diagram of a user interface screen for changing the scheduled time for committal for an uncommitted bandwidth modification request in accordance with an exemplary embodiment.

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

It is to be understood that both the foregoing background description and the following detailed description are exemplary and explanatory only and are not restrictive of the invention as claimed.

An exemplary embodiment described below permits a network customer to dynamically allocate bandwidth across a network of nodes by providing an input interface that accepts a bandwidth modification request and a processing server that applies the request to a network node and changes customer billing information. Such an embodiment may add dramatic value to a customer's private network by allowing the network customer to tailor network bandwidth to meet changing bandwidth needs. The customer may avoid paying for too much bandwidth, and may conveniently schedule more bandwidth as needed. In some embodiments, bandwidth changes that took days or weeks under previous methods and systems may now be performed or scheduled in substantially or near real-time.

Additionally, some embodiments allow the customer to schedule bandwidth modifications in advance. For example, if network demands fluctuate seasonally, an embodiment allows the customer to anticipate the fluctuation by scheduling a future bandwidth modification. In some embodiments, the customer is not billed for increased bandwidth until the modification is committed. At that time, the processing server may automatically adjust the customer's billing information. In other embodiments, the billing change occurs before the bandwidth modification request is committed. Therefore, changing billing information in association or accordance with the bandwidth modification may occur before, after, or simultaneously with the bandwidth modification.

Some embodiments discussed herein may also reduce costs for the service provider by streamlining the bandwidth modification process and/or decreasing operational costs.

Figure 1B:
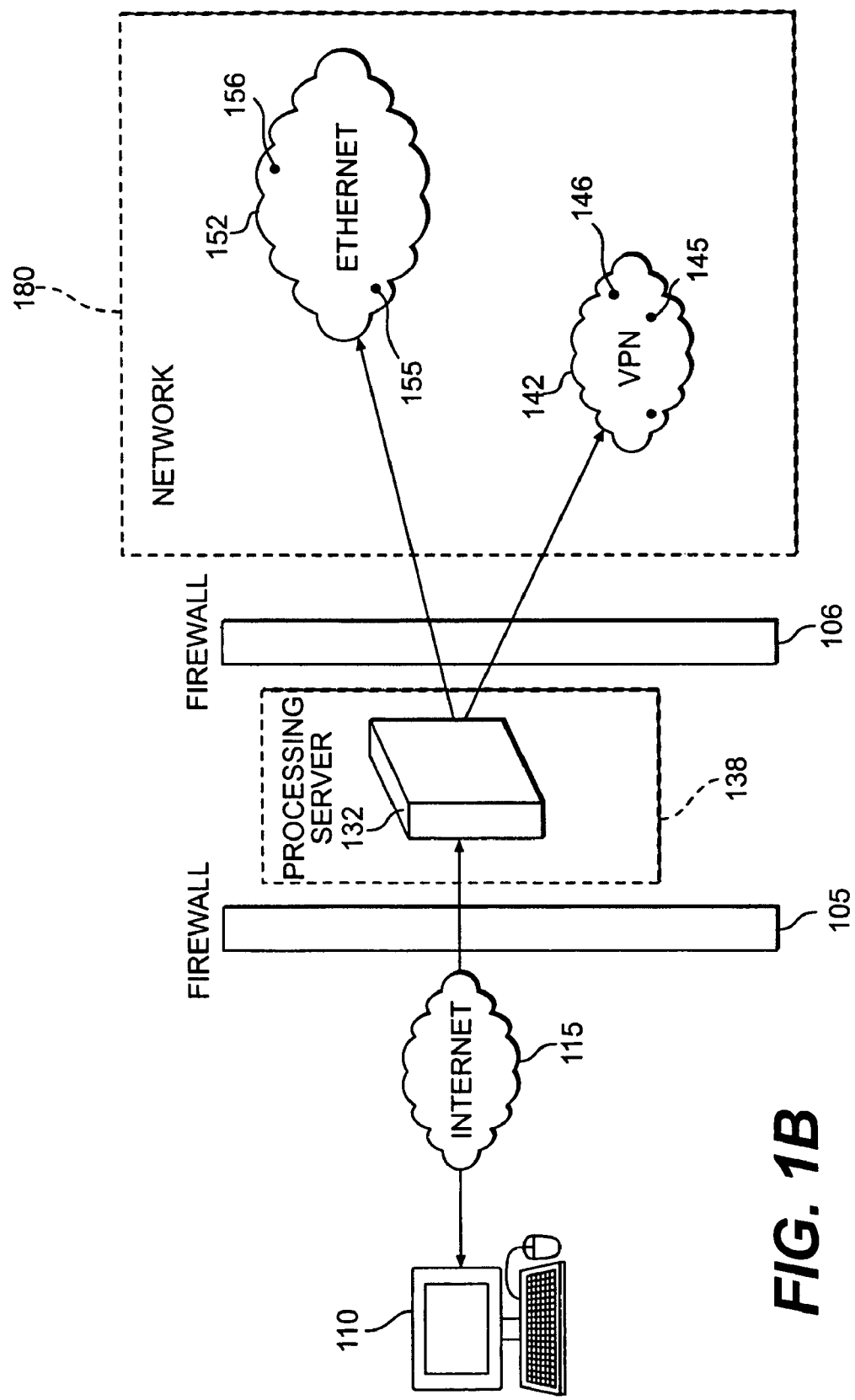

FIGS. 1A and 1B are overview diagrams of exemplary components used to allocate network bandwidth in accordance with exemplary embodiments. Referring now to the example in FIG. 1A, computer 110 is connected to input interface 120 through firewall 105. In turn, input interface 120 is connected with a processing server 138 and network of nodes 180. A network customer (not shown) communicates with the input interface 120 via computer 110 so that the interface 120 can validate the network customer's identification. This validation ensures the network customer is who they say they are. For example, validating the network customer's identification may involve the input of a username and password. Then, the network customer uses computer 110 to send a bandwidth modification request, which is received by input interface 120. The input interface 120 may in turn pass the request to the processing server. As shown in FIG. 1A, the input interface 120 may be implemented as a server, such as a web server. In some embodiments, the input interface may include a plurality of servers. For example, validating the network customer identity might be handled by one or more servers, and receiving a bandwidth request might be handled by some other configuration of one or more servers. In still other embodiments, such as in FIG. 1B, the input interface may be part of the processing server 130.

In some embodiments, such as those illustrated in FIGS. 1A and 1B, the input interface 120 sits behind a firewall 105 for security reasons, and validates the identity of the network customer communicating with the input interface via computer 110. Although the network customer uses computer 110 in both FIGS. 1A and 1B, some embodiments allow the network customer to connect by using a different device, such as a PDA or other mobile computing device in communication with the network. In some embodiments, validating the network customer identity helps determine what bandwidth modifications the network customer may make. For example, a company may designate different network responsibilities to different employees. Each employee may have a distinguishing network customer identity that an embodiment may compare against a lookup table to determine the amount of access the validated network customer has.

The manner in which the input interface 120 receives the bandwidth change request from the network customer can vary. For example, the input interface may be configured to allow a network customer to securely connect through a private portal. Alternatively, as shown in FIG. 1B, an embodiment may allow the network customer to connect through a public network, such as the Internet 115. In some embodiments, the input interface 120 may provide a graphical user interface (GUI) for the network customer. In other embodiments, the GUI may be part of a client application on computer 110 that is capable of communicating with the input interface 120. It will be understood that numerous configurations are possible for providing a secure connection between the network customer the input interface.

Once a bandwidth modification request has been received by the input interface, the input interface communicates the request to the processing server 138. In some embodiments, the processing server 138 sits behind an additional firewall 106. The processing server 138 may consist of one or more servers. For example, in FIG. 1A, the processing server 138 may be implemented with an application server 130 and a billing server 150. Both of these servers may also consist of more than one server. In the example shown in FIG. 1A, the application server 130 is in communication with the input interface and handles the scheduling and committal of bandwidth modification requests. The billing server 150 changes customer billing information in response to the bandwidth modification requests received and/or committed by the application server 130. All of these servers may be integrated into one or more servers in some embodiments, such as the integrated server 132 in FIG. 1B.

The bandwidth modification request may include a future time indicative of when the bandwidth modification should be committed. The future time, as received from the network customer, may be later that day or on a future date. When the request includes a future time for committal, the processing server 138 schedules the bandwidth modification request to be committed when the future time arrives. The processing server 138 may commit the request by applying the bandwidth modification to one or more applicable node settings. The one or more node settings may be changed in a way that allocates bandwidth as requested by the network customer.

Accordingly, committing the request involves applying the bandwidth modification to a setting for at least one node, such as 145, 146, 155, or 156, within the private network 180. The network customer may, as part of the bandwidth modification request, identify at least one node in some embodiments. In other embodiments, an applicable node is determined by the processing server 138 based on some other selection by the network customer, such as a site ID for where the bandwidth modification request should apply. In still other embodiments, the network customer may submit a bandwidth modification request and then later make a selection that identifies a node to which the request applies. In some embodiments, the site ID may correlate to a plurality of nodes.

The future time for committal may be received as part of the bandwidth modification request or separately from the bandwidth modification request. In either instance, the future time for committal is considered to be part of the bandwidth modification request for the purposes of this disclosure.

In addition, some embodiments may allow the network customer to schedule a bandwidth modification request irrespective of the current bandwidth limitations of the service provider. For example, the network customer may schedule a bandwidth modification request in anticipation that the service provider will be capable of handling the request when the scheduled committal time arrives. When the processing server 138 attempts to commit the bandwidth modification request, the bandwidth modification request may be rejected if the requested bandwidth cannot be provided. A rejected bandwidth modification request may be designated with a "failed" status.

Unlike a scheduled bandwidth change request, when a real-time bandwidth modification request is received, it may be committed without scheduling. However, in other embodiments, the real-time bandwidth modification may still be scheduled. For example, the scheduled time may indicate that committal should occur as soon as possible.

In some embodiments, the processing server 138 changes the customer billing information. As an example, if a network customer raises the committed access rate for a premium service class, the increased bandwidth will generally cost more. Specific billing rules vary between embodiments. In some embodiments, the processing server changes the billing information immediately after changing the allocation of the bandwidth. In other embodiments, the processing server 138 may wait a period of time before the billing change is applied. In still other embodiments, the processing server 138 may change the billing information as soon as a bandwidth modification request is received. For example, the billing change may be applied when the bandwidth modification request is received, or at some other time before the bandwidth modification request is committed.

The storage of billing information will typically include a storage device, such as a hard drive or database. As shown in FIG. 1A, and as previously discussed, tracking and changing billing information may involve at least one server 150 in some embodiments. In other embodiments, an integrated server 132 may include the billing functionality, as shown in FIG. 1B.

Figure 2:
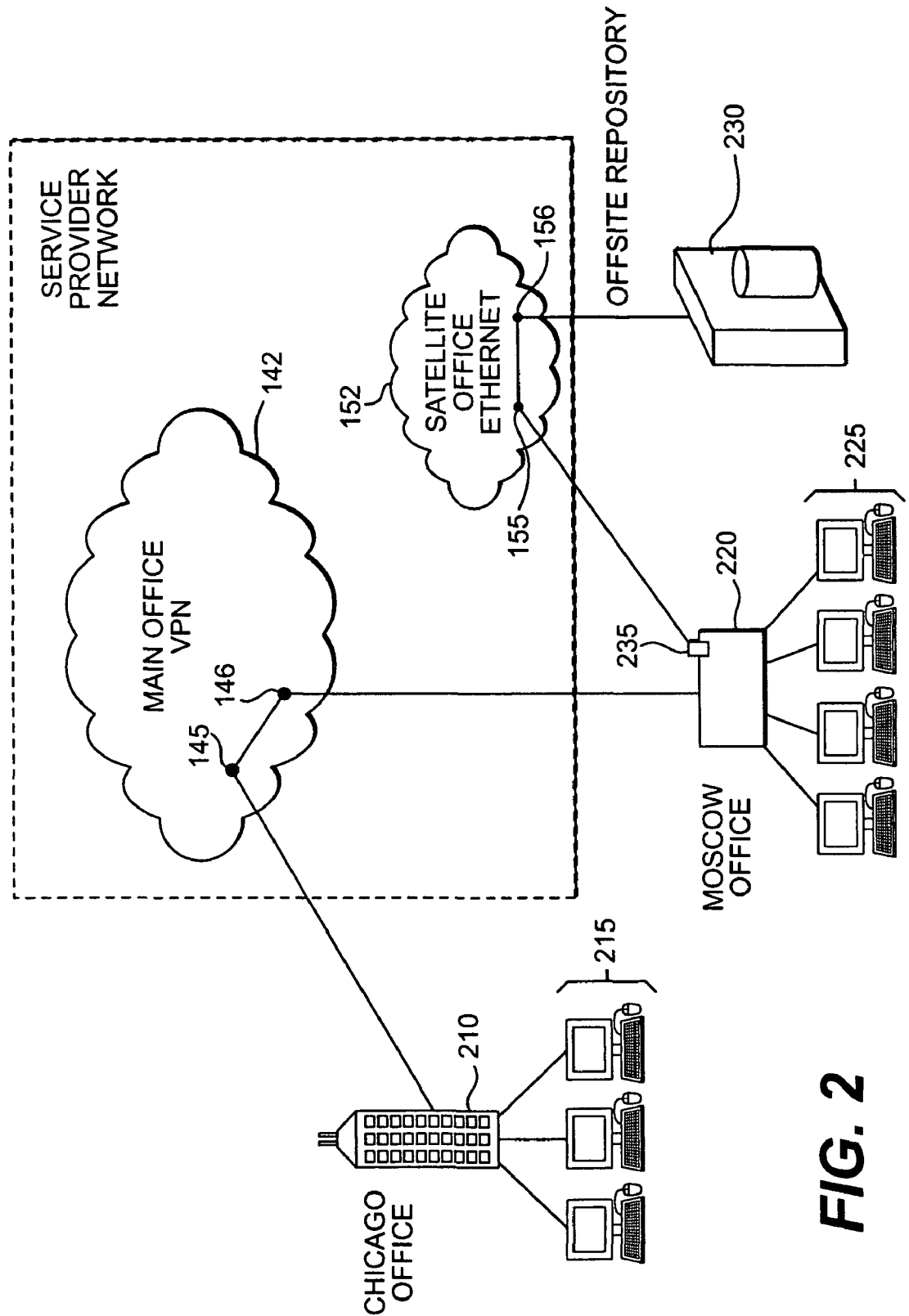
FIG. 2 is an overview diagram of an exemplary network wherein bandwidth settings may be modified in accordance with certain exemplary embodiments.

FIG. 2 is an overview diagram of an exemplary network wherein bandwidth settings may be modified in accordance with exemplary embodiments. As shown in FIG. 2, a Chicago Office 210 and Moscow Office 220 are connected by a VPN 142 across nodes controlled by a service provider as part of a service provider network. The communications to and from the Chicago Office pass through node 145, while communications to and from the Moscow Office pass through node 146. In this example, nodes 145 and 146 are at the edge of the network. The exact route between nodes 145 and 146 may include other nodes as determined by the service provider. As shown in the embodiment of FIG. 2, some of the network traffic remains local and does not pass through the service provider's portion of the private network. For example, computers 215 within the Chicago Office 210 may communicate with each other exclusively through an internal private network at the Chicago Office.

In some embodiments, policing may occur at edge nodes, such as nodes 145 and 146. Policing is a way to manage traffic throughput. For example, node 145 may have a committed access rate of 512 kilobits per second for a particular class of service. If more than 512 kilobits per second enters node 145 from the Chicago Office 210 for that particular class of service, the excess traffic is dropped. However, once the traffic passes through node 145 from the Chicago Office 210 and is inside the VPN 142, the traffic makes its way to node 146 and then to the Moscow Office 220 without further policing by the service provider. If excess traffic is routinely dropped, the network customer may wish to submit a bandwidth modification request in accordance with one of the embodiments.

Accordingly, a network customer may submit a bandwidth modification request for nodes 145 and 146 in an embodiment of the invention. More specifically, some embodiments may allow the network customer to modify the port speed of node 145, thereby changing the total level of traffic allowed over the VPN 142 to and from the Chicago Office 210 at any one time. For example, as traffic needs increase, the network customer may advantageously use an embodiment of the invention to select a higher port speed at node 145. The port speed may, in some embodiments, be set as low as 64 kbps, or much higher, such as 100 Mbps, depending upon the implementation of the network and its nodes.

Similarly, some embodiments allow the network customer to modify the committed access rate, which often limits the bandwidth allocated to a particular class of service. For example, a network customer may assign different committed access rates for: Real-Time, Video, Mission Critical, Transactional Data, and General Business (Best Effort) service classes in some embodiments. In the example illustrated in FIG. 2, it may be imperative that private voice communications between the Chicago Office 210 and the Moscow Office 220 are not dropped due to lower-priority traffic, such as general Internet usage. Accordingly, Voice over IP (VoIP) is generally designated a high-priority service class. The user specifies which processes fall into which classes by an onsite device, such as a router or controller, to classify traffic appropriately. In a PIP system, the onsite device (e.g., at Chicago Office 210) may designate traffic classes based on IP precedence settings specified in the IP header of the IP traffic. Then, the network customer may use an embodiment of the present invention to set the committed access rate as desired for the applicable class of service to ensure enough bandwidth for that service class. It should be noted that setting the port speed, committed access rate, or Ethernet flow too low can be detrimental, as discussed in more detail below with reference to FIG. 11.

FIG. 2 also includes a private line from the Moscow Office 220 to an offsite repository 230. In this example, the private line is implemented over an Ethernet network 152. Nodes 155 and 156 of the Ethernet network may, in some embodiments, utilize switches. Typically, the service provider builds a private line through a network of switches that connect nodes 155 and 156, and no routing is involved. In some embodiments, switch 235 is installed at the customer site (e.g., the Moscow Office 220). The bandwidth settings along the private line from the Moscow Office 220 to the Offsite Repository 230 can be modified according to an embodiment disclosed herein. For example, the Moscow Office may implement a T1 connection at interface 235, and the private line extending from node 155 (or interface 235) may have a Ethernet access speed of 10 megs per second. Ethernet access speed may be the total bandwidth allowed through the nodes of the private line per second, much like the port speed setting of node 145 in the VPN. If the network customer wishes to restrict the amount of bandwidth dedicated to a user, process, or class of service, an embodiment may be used to set the Ethernet flow rate to specify a bandwidth ceiling on the user, process, or class of service. In some embodiments, Ethernet flow may be synonymous with Ethernet Virtual Connection.

Figure 3A:
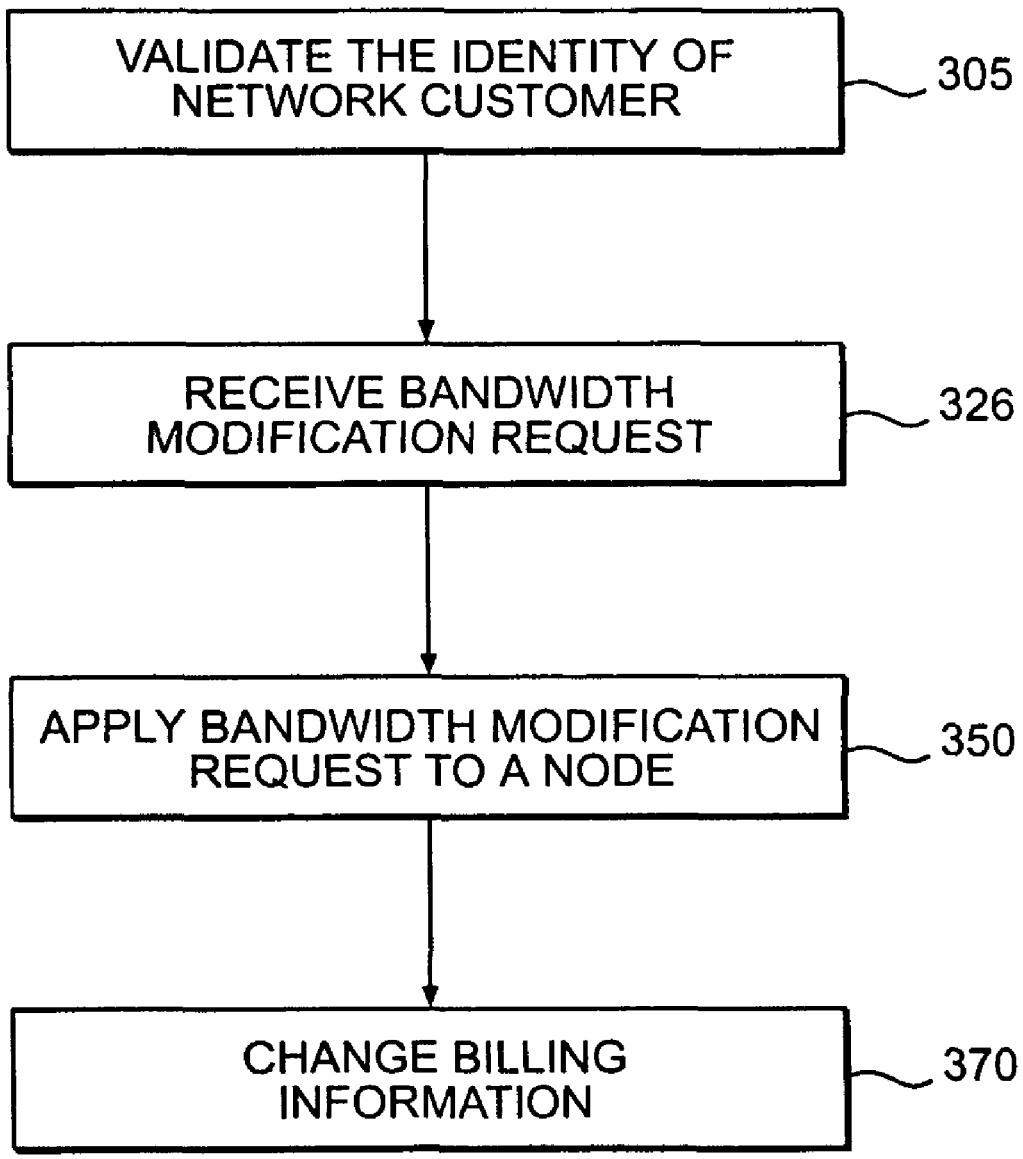
FIGS. 3A-3B are exemplary flow charts that include steps for dynamically allocating bandwidth and changing billing information in accordance with certain exemplary embodiments.
Figure 3B:
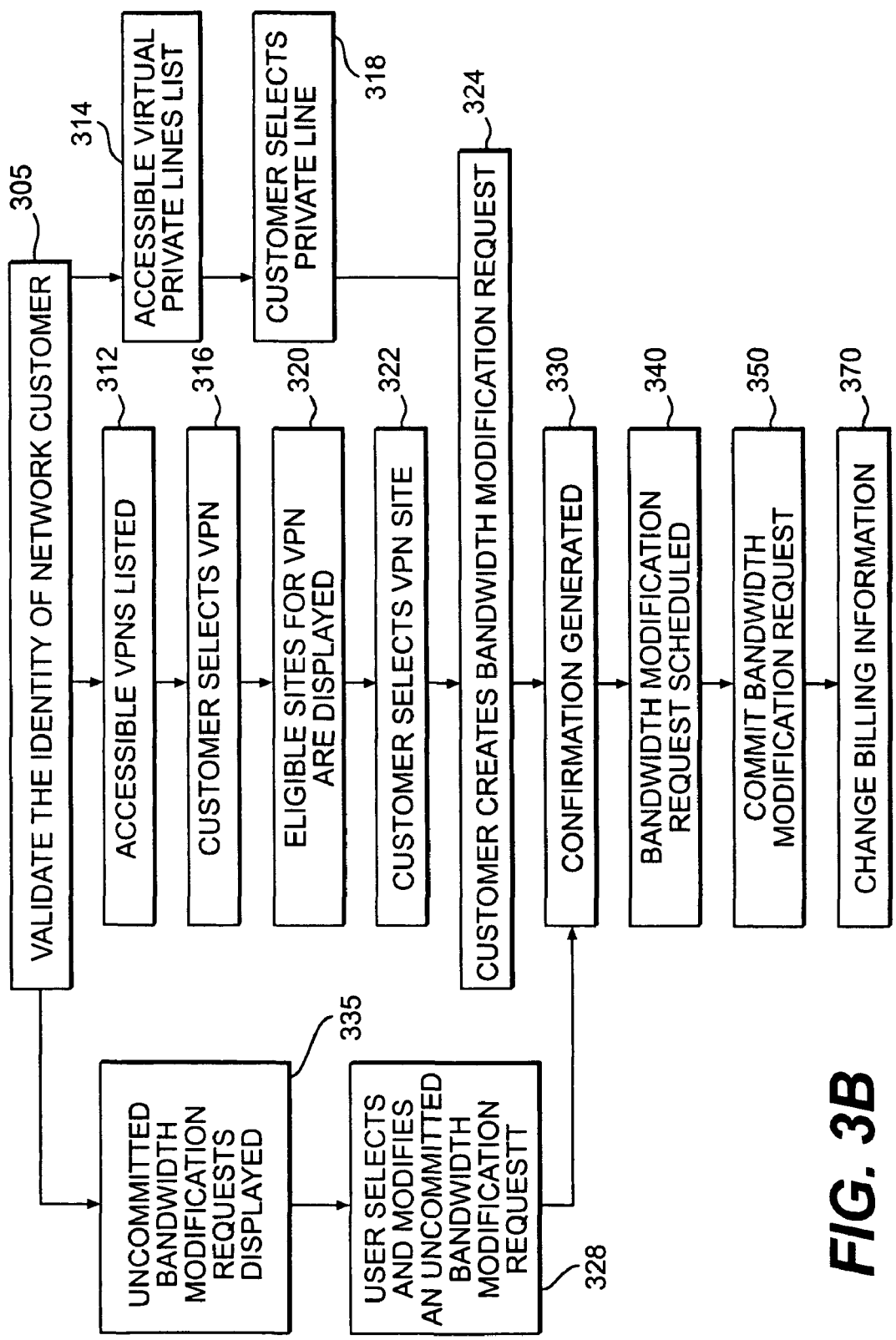

FIGS. 3A-3B are exemplary flow charts including steps for dynamically allocating bandwidth and changing billing information in accordance with exemplary embodiments. Turning now to FIG. 3A, an embodiment validates the identity of the network customer in step 305. As mentioned, validating the network customer is one way to keep an invalid user from submitting harmful bandwidth modification requests to the customer's private network. Additionally, some embodiments may limit the available bandwidth modification options depending on the identity of the network customer. For example, a company may delegate greater access to a senior network administrator that oversees the entire network than to an employee who is only responsible for a portion of the network (e.g., the Moscow Office 220). In this way, the network nodes available for bandwidth modification may be appropriately limited.

At step 326, the bandwidth modification request is received. In one example embodiment, the request may include an identifier that allows associating the bandwidth modification request to a particular node or nodes. In addition, in some embodiments, the bandwidth modification request may specify the type of bandwidth change desired, such as port speed or committed access rate, along with a chosen bandwidth value. Further, some bandwidth modification requests may include a particular class of service to which the request applies. In some embodiments, the bandwidth modification request may also include a future time for the bandwidth modification request to take effect or be committed. As previously discussed, the future time may be any point in the future, as limited by rules specific to the embodiment. FIGS. 4-13 provide a detailed example of how a network customer might create and send a bandwidth modification request.

Next, step 350 applies the bandwidth modification request to an associated node. For example, the processing server contacts the node, such as node 145 of FIG. 2, and applicable hardware settings at the node are modified to fulfill the request made by the network customer. Once the bandwidth modification request has been applied to the applicable node or nodes, the request is considered to be "committed."

Finally, step 370 changes the billing information. Typically, adding more bandwidth, especially high priority bandwidth, will cost the customer more. However, the exact billing parameters vary depending on the rules of the particular embodiment. The billing information may also be updated at varying points in the process, depending on the embodiment. For example, some embodiments may change the billing information after the bandwidth change request is committed. Other embodiments may change billing information before the bandwidth modification is fully committed.

FIG. 3B is a more detailed flow chart of an embodiment that includes additional steps that may be followed, and also includes some steps that may be carried out by the network customer. After validating the identity of the network customer in step 305, the input interface may send at least one selection option to the network customer for display, for example, on computer 110. The selection option may include a list of uncommitted bandwidth modification requests 335, a list of accessible VPNs 312, and/or a list of accessible virtual private lines 314. The network customer may select the desired VPN or private line in steps 316 and 318 from the respective list. In some embodiments, if the network customer selects a VPN, the various sites of the VPN are then listed in step 320. For example, referring back to FIG. 2, a site for Chicago Office 210 and a site for Moscow Office 220 may be displayed after the network customer selects "Main Office VPN." As previously mentioned, the set of sites displayed may depend on the access restrictions of the validated network customer.

In step 322, the network customer selects a site for the bandwidth modification. Alternatively the customer may select a private line for the bandwidth modification in step 318. In some embodiments, these site locations may be tied to at least one network node.

After the site or private line is selected, the network customer creates a bandwidth modification request at step 324. The bandwidth modification request may then be received by the input interface or other structure used to carry out the method. In some embodiments, the input interface may send a confirmation to the network customer, displayable, for example, on computer 110. These steps are explored more fully in tandem with FIGS. 5-13, below.

At step 340, the bandwidth modification request is scheduled. In some embodiments, this allows for scheduling bandwidth modifications to take place in the future. Creating a real-time bandwidth modification is request may not involve step 340 in some embodiments. Other embodiments may schedule the real-time request to be committed as soon as possible.

At step 350, the bandwidth modification request is committed, and billing information is changed in step 370. Both of these steps are discussed above with reference to FIG. 3A.

FIGS. 4-13 depict various exemplary diagrams of user interface screens that a network customer may use to create a bandwidth modification request. The example graphical user interface (GUI) screens are displayed, for example, on computer 110 or some other device. The bandwidth modification request can, for example, be sent from computer 110 (or other device) and received by the input interface, as previously discussed. In some embodiments, some information presented on the user interface screen is retrieved as a result of the user's communicating with the input interface. For example, a graphical user interface application may pull data by making requests to the input interface. In other embodiments, the graphical user interface may be a web-based application generated by the input interface.

Figure 4:
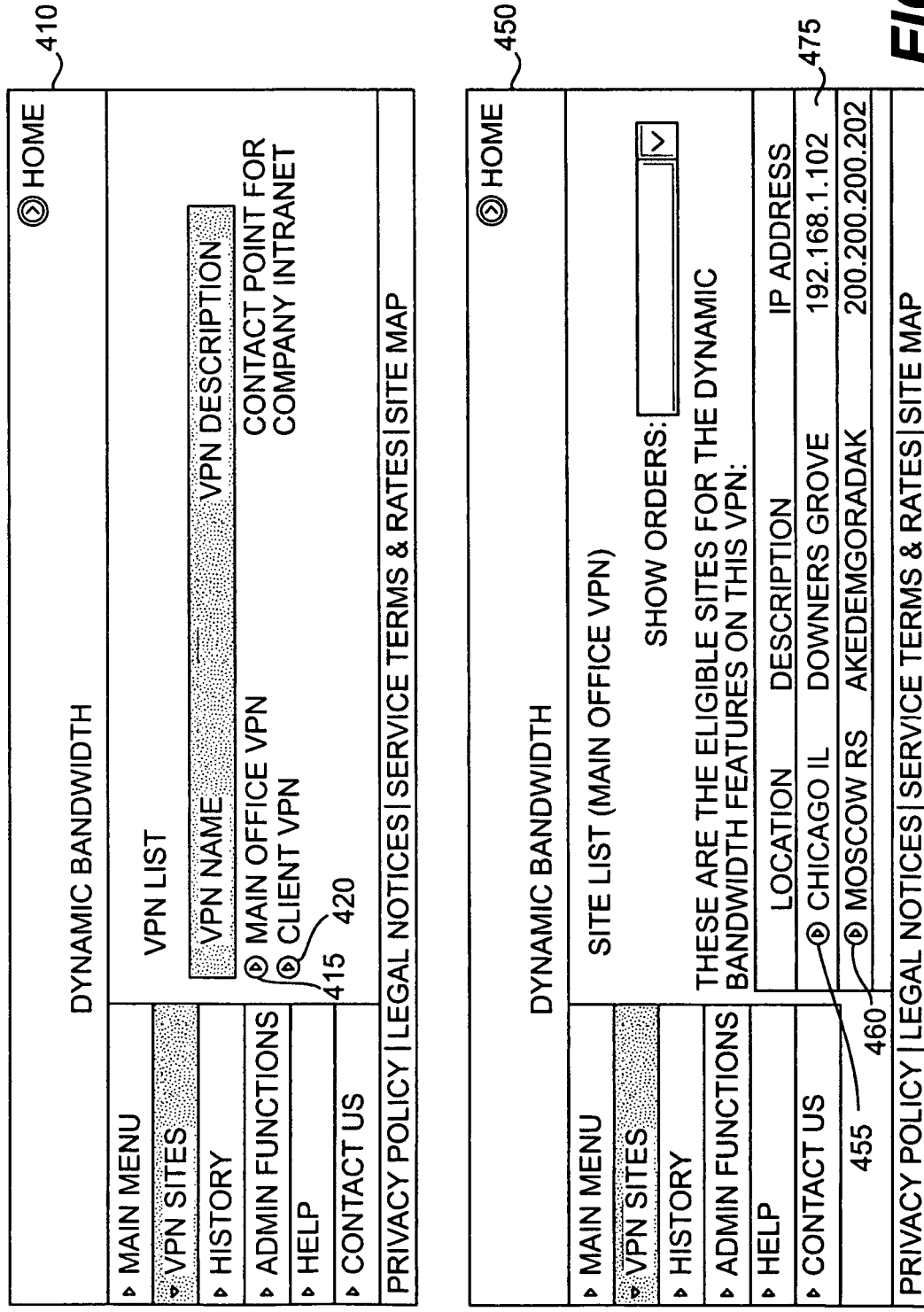
FIG. 4 is an exemplary diagram of user interface screens for selecting a VPN node for bandwidth modification in accordance with an exemplary embodiment.

FIG. 4 is an exemplary diagram of GUI screens that can be used for selecting a VPN node for bandwidth modification in accordance with an exemplary embodiment of the present invention. In the example of screen 410, the network customer is presented with a list of available VPNs. Main Office VPN 415 coincides with the example VPN 145 shown in FIG. 2. Client VPN 420 is another VPN the network customer may access.

When the network customer selects Main Office VPN 415, a list of available VPN sites 455 and 460 is displayed in example interface screen 450. The Chicago site 455 corresponds to node 145 in FIG. 2, which polices traffic from the Chicago Office 215. Similarly, the Moscow site 460 corresponds to node 146, which polices traffic from the Moscow Office 220. While some interfaces may display identifiers for nodes 145 and 146, other embodiments may track site-to-node correlations internally. Therefore, in some embodiments, by selecting a site, the network customer selects a node to which the bandwidth modification request will apply.

Figure 5:

Once a site has been selected, some embodiments may display a GUI screen like the example screen shown in FIG. 5. The network customer may then select which type of bandwidth modification request to create. In this example, the network customer may select between PORT (port speed) or CAR (committed access rate) at 520. After the network customer selects the type of bandwidth modification, additional options may be displayed. For example, when the network customer selects committed access rate at 520, selection options for the class of service 530 and the traffic rate 550 may appear. In some embodiments, the available class of service options 530 and/or committed access rate options 550 may be limited based on the identity of the network customer.

Additionally, some GUI's provide a control 510 that allows the network customer to select a future time for committing the bandwidth modification request. Some embodiments may allow the network user to select only a future date, while others may additionally allow the network user to select a time along with the future date. The "scheduled time" or "future time," as referred to herein, may include both a date and a time, or just a date or time.

A plurality of bandwidth modification requests may be created for the same node in some embodiments. For example, the list box 540 may track more than one bandwidth modification request. In this example, the network customer adds a new bandwidth modification request to the list box 540 by clicking the button at 550. Bandwidth modification requests may be removed by selecting the request and clicking "remove" at 560. When the network customer is satisfied with the one or more bandwidth modification requests, they may schedule the bandwidth modification request(s) by selecting "Schedule This Job" at 570. In other embodiments, each bandwidth modification request is scheduled independently, and may not involve the use of a list box 540.

Turning now to FIG. 6, an example GUI screen is illustrated that allows the network customer to create a real-time bandwidth change request. In this example, it may not be necessary for the network customer to select a future time for committing the modification request. The real-time bandwidth modification request may be created when the network customer clicks the button at 620.

Figure 7:
Figure 8:
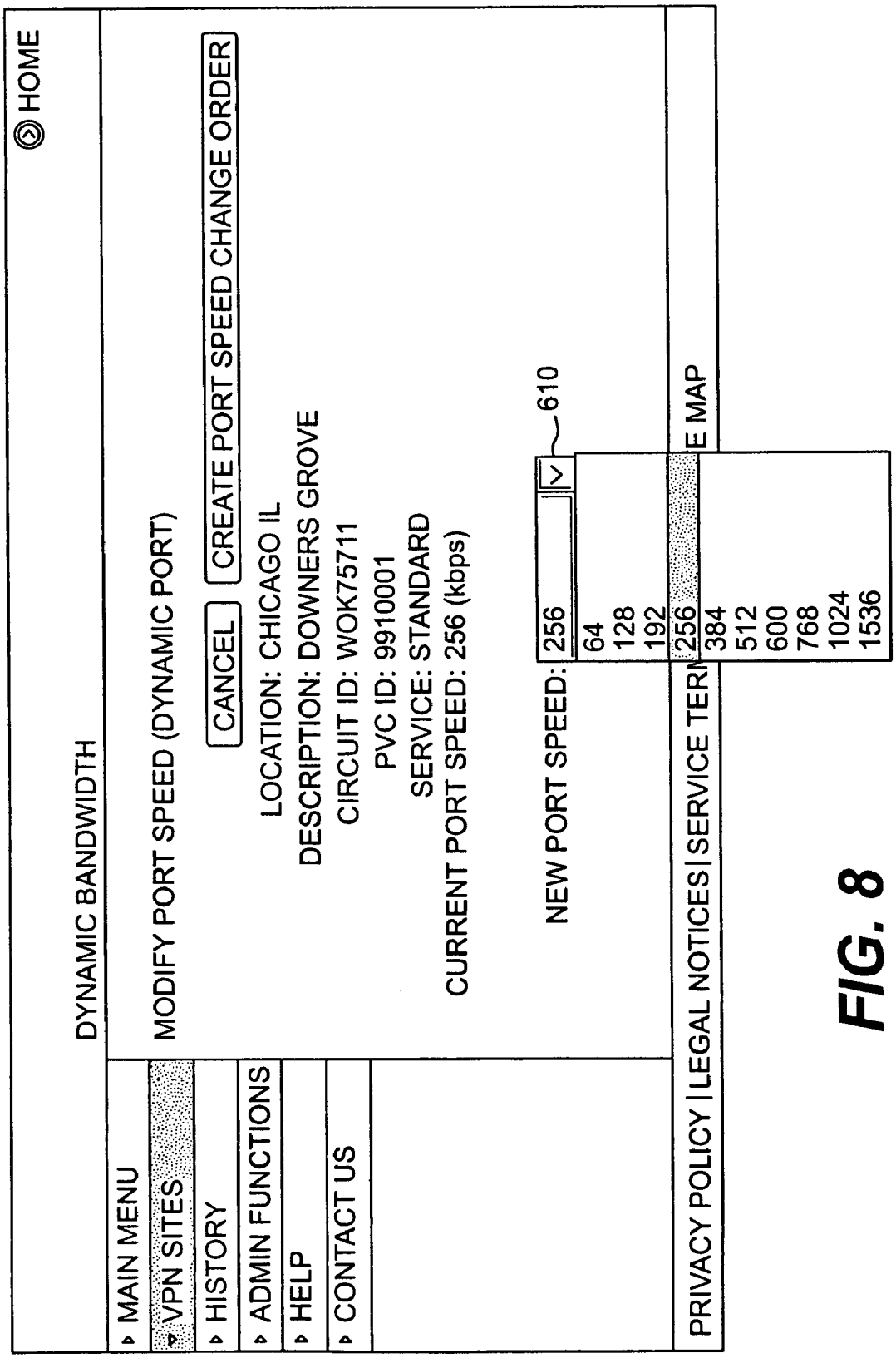

FIG. 7 illustrates an example GUI screen presented to the network customer when the network customer desires to change the port speed. In this example, the present port speed 705 may be displayed, and a new port speed 710 may be selected. As with committed access rate, some embodiments, such as in FIG. 8, do not require the network customer to schedule the modification to occur at a future time. Instead, in an embodiment such as FIG. 8, the network customer may simply select the new port speed 710 and submit the bandwidth modification request.

Figure 9:
FIGS. 9-10 are exemplary diagrams of user interface screens for creating a bandwidth modification request for a private line in accordance with an exemplary embodiment.

FIG. 9 is an exemplary diagram of a user interface screen for creating a bandwidth modification request for a private line in accordance with an exemplary embodiment of the present invention. The end points of the private line may be defined by Location A 910 and Location Z 920. These locations may correspond to first and second nodes, respectively, in other embodiments. The private line may be identified at 905, although such identification may be internal to the system in other embodiments. The network customer may make a bandwidth modification to the private line 905 by following a methodology similar to creating a CAR or PORT modification request. Of the embodiments that allow the network customer to make changes to private line bandwidth, some embodiments allow for specifying a future time for committal. Other embodiments, such as the example in FIG. 10, allow for real-time bandwidth modifications. Further details regarding such modification are described below regarding FIG. 10.

In addition, the FIG. 9 example includes a list of several bandwidth modification requests in various states. For example, some bandwidth modification requests, such as at 940, are not complete because they have not been submitted by the network customer. In some embodiments, the network customer may select the request at 930 and take the steps necessary to complete the request. Request 950 has have been received by the input interface but has not yet reached the scheduled time for committal. The network customer may also further modify this request in some embodiments. Other example requests on the list include a failed bandwidth modification request at 930, and a committed bandwidth modification request at 925.

Figure 10:
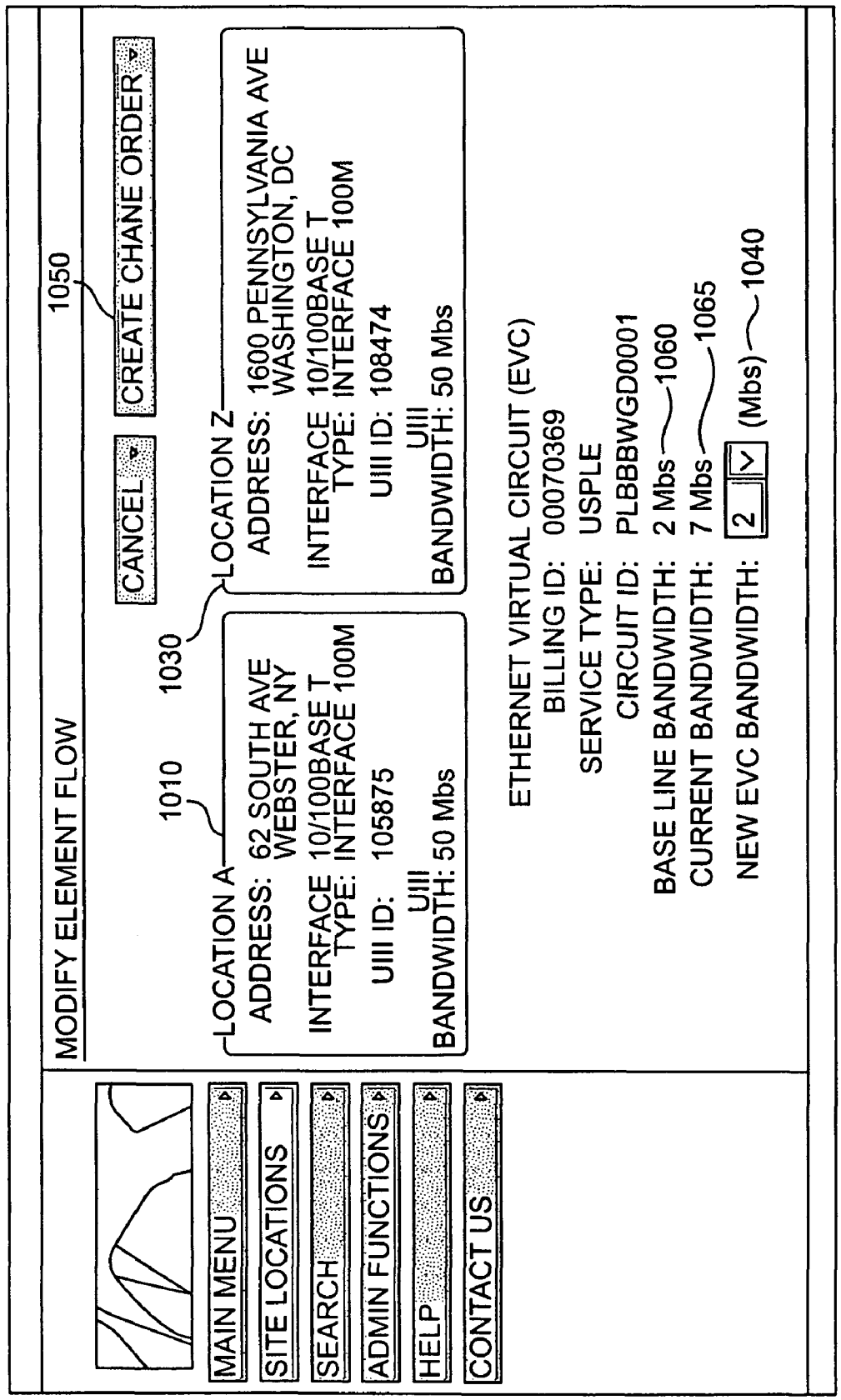

Turning to the example in FIG. 10, a network customer may create a real-time bandwidth modification request for a private line by selecting a bandwidth setting 1040 and clicking the button at 1050 according to an embodiment of the present invention. Some embodiments may include a base line bandwidth 1060, which is the minimum bandwidth setting possible on the private line. The Ethernet flow rate, which may be the speed of the line between points 1010 and 1030, usually cannot exceed the Ethernet access rate, which is the total capable bandwidth across the line. It should be noted that the term Ethernet flow, as used herein, may generally apply to any private line on any network configuration, and is not limited to only Ethernets.

As shown in FIG. 11, the input interface may generate a confirmation request for displaying to the network customer in accordance with an embodiment of the present invention. In those embodiments, the confirmation may be generated before or after the customer schedules a bandwidth modification request, depending on the embodiment. Some embodiments require the network customer to accept the statements in the confirmation using an "ACCEPT" button 1130 before the bandwidth modification request is scheduled or committed.

The confirmation may contain information about billing changes 1110 or information about a configuration conflict 1120. A configuration conflict may include a warning about a change the network customer should make to settings on a local device. For example, a conflict may occur if a local device sends data to a network node at a rate faster than the committed access rate, which would cause the node to drop the excess data packets. Therefore, synchronizing onsite devices with a new committed access rate can help avoid network problems. One way to synchronize the hardware may be to use a "shaping" setting that delays the sending of data that would be above the committed access rate. In some embodiments, the node may incorporate a shaping setting to help prevent a potential synchronization conflict.

Additionally, the confirmation may alert the customer that the bandwidth modification request conflicts with other settings within the private network. For example, if the customer uses the network for Voice over IP (VoIP), reducing the committed access rate from 40.456 k to 8 k can adversely affect the quality of Voice over IP calls on that link, because 8 kbps may not be enough bandwidth for the voice information. As another example, setting the committed access rate above the port speed may not be allowed.

In some embodiments, the confirmation may notify the network customer of a billing change so the customer knows in advance what they are purchasing.

FIG. 12 is an exemplary diagram of an interface screen used to select and modify an uncommitted bandwidth modification request in accordance with an exemplary embodiment. In general, FIG. 12 depicts one way to reschedule a bandwidth modification request. In this example, the network customer may select a scheduled request, such as request 1250, and change the parameters of the request by using buttons 1210 and 1220. The parameters that may be changed depend on the embodiment, but may include the scheduled time, bandwidth change request type, and/or bandwidth change amount. In some embodiments, an uncommitted bandwidth modification request may be canceled or deleted. The exemplary interface screen of FIG. 12 may also be used to reschedule bandwidth modification requests in some embodiments.

The exact GUI configuration may vary in other embodiments depending upon the precise implementation. Additionally, not all embodiments include an option to modify or reschedule uncommitted bandwidth modification requests.

FIG. 13 includes an example GUI screen for rescheduling at least one bandwidth modification request in accordance with an exemplary embodiment. In this example, by utilizing the date and time controls 1310, the network customer can change the scheduled time for committing the bandwidth change request. As for rescheduling, some embodiments may allow the network customer to reschedule more than one bandwidth modification request at one time. This is typically done by organizing the requests into a group, and then rescheduling the entire group at once. Other embodiments may allow the rescheduling of a bandwidth modification request without grouping the request. Some embodiments limit the rescheduling of bandwidth modification requests to only those requests in a particular status. For example, rescheduling may only be available for bandwidth modification requests that are currently scheduled, need attention, or have failed.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for dynamically allocating bandwidth across a network including a site that includes a plurality of nodes comprising:
   an input interface configured to validate the identity of a network customer and receive a bandwidth modification request from the network customer when validated, wherein the bandwidth modification request identifies the site to which the bandwidth modification request applies, and wherein the input interface allows the network customer to request a change to port speed and committed access rate for the plurality of nodes associated with the site;
   a processing server in communication with the input interface, the first node and the second node, wherein the processing server is configured to apply the bandwidth modification request to at least the first node, thereby committing the bandwidth modification request, and change billing information for the network customer in accordance with the bandwidth modification,
   wherein the bandwidth modification request specifies a change to the committed access rate of a first class of service associated with the site, wherein the bandwidth modification request prioritizes the first class of service above a second class of service for the plurality of nodes by assigning more bandwidth to the first class of service than to the second class of service, wherein the first and second classes of service are associated with the customer and the first and second classes represent different types of bandwidth usage.

2. The system of claim 1, wherein bandwidth modification request includes a change to the port speed of the first node.

3. The system of claim 1, wherein the first node and the second node form a private line within the network, and the bandwidth modification request includes a change to Ethernet flow over the private line.

4. The system of claim 1, wherein the processing server is configured to schedule the bandwidth modification request to be committed at a future time, the future time being received from the network customer by the input interface.

5. The system of claim 1, wherein the input interface is configured to receive a second input from the network customer as a change to the bandwidth modification request prior to committal of the bandwidth modification request by the processing server, and wherein the input interface is configured to notify the processing server of the change to the bandwidth modification request.

6. The system of claim 1, wherein input interface is configured to:
   send a list of uncommitted bandwidth modification requests to the network customer; and
   receive from the network customer a communication scheduling at least one of the listed bandwidth modification requests for committal.

7. The system of claim 1, wherein the input interface is configured to send confirmation information to the network customer before the bandwidth modification request is committed by the processing server.

8. The system of claim 7, wherein the confirmation information includes at least one of:
   a notification of a billing change; and
   a notification of a potential conflict associated with the bandwidth change request.

9. A computer-implemented method for dynamically allocating bandwidth across a network including a site that includes at least a first node and a second node, the method comprising:
   validating, via a processor, the identity of a network customer;
   receiving, via an interface, a bandwidth modification request from the network customer, specifying a change to a port speed and a committed access rate for the site, wherein the change to the committed access rate applies to a first class of service associated with the first and second nodes of the site to prioritize the first class of service above a second class of service by assigning more bandwidth to the first class of service than to the second class of service, wherein both the first and second classes of service are associated with the customer and the first and second classes represent different types of bandwidth usage;
   applying the bandwidth modification request to the first and second nodes, thereby committing the bandwidth modification request; and changing, via the processor, billing information in association with the bandwidth modification.

10. The method of claim 9, wherein bandwidth modification request includes a change to the port speed of the first node.

11. The method of claim 9, wherein the first node and the second node form a private line within the network, and the bandwidth modification request includes a change to Ethernet flow over the private line.

12. The method of claim 9, wherein the bandwidth modification request is committed at a scheduled time, the scheduled time being a future time received from the network customer.

13. A non-transitory computer-readable medium containing instructions for allocating bandwidth across a network including a site comprising a plurality of nodes, the instructions, when executed by a processing unit, causing the processing unit to:

validate the identity of a network customer;

receive a bandwidth modification request from the network customer that specifies a change to port speed and committed access rate for the site, wherein the change to the committed access rate applies to a first class of service associated with the plurality of nodes to prioritize the first class of above a second class of service by assigning more bandwidth to the first class of service than to the second class of service, wherein both the first and second classes of service are associated with the customer and the first and second classes represent different types of bandwidth usage;

apply the bandwidth modification request to the plurality of nodes, thereby committing the bandwidth authorization request; and change billing information in association with the bandwidth modification.

14. The computer-readable medium of claim 13, wherein bandwidth modification request includes a change to the port speed of a first node associated with the site.

15. The computer-readable medium of claim 13, wherein the bandwidth modification request is committed at a scheduled time in the future, wherein the future time is selected by the network customer and received from the network customer as part of the bandwidth modification request.

16. The computer-readable medium of claim 15, wherein the bandwidth modification request applies to a particular class of service selected from a plurality of classes of service.

17. The computer-readable medium of claim 13, wherein the first node and the second node form a private line within the network, and the bandwidth modification request includes a change to Ethernet flow over the private line.

* * * * *